(12) United States Patent
Nilsson et al.

(10) Patent No.: US 12,736,392 B2
(45) Date of Patent: Sep. 15, 2026

(54) SYSTEM AND METHOD FOR LOCKING A SUSPENSION SYSTEM TO WEIGH A VEHICLE

(71) Applicant: Volvo Truck Corporation, Gothenburg (SE)

(72) Inventors: Christofer Nilsson, Lindome (SE); Tommy Rosgardt, Lindome (SE)

(73) Assignee: Volvo Truck Corporation, Gothenburg (SE)

( * ) Notice: Subject to any disclaimer, the term of this patent is extended or adjusted under 35 U.S.C. 154(b) by 377 days.

(21) Appl. No.: 18/532,009

(22) Filed: Dec. 7, 2023

(65) Prior Publication Data

US 2024/0201004 A1 Jun. 20, 2024

(30) Foreign Application Priority Data

Dec. 16, 2022 (EP) .................................... 22214225

(51) Int. Cl.
*G01G 19/03* (2006.01)

(52) U.S. Cl.
CPC .................................. *G01G 19/035* (2013.01)

(58) Field of Classification Search
CPC ........................... G01G 19/024; G01G 19/035
See application file for complete search history.

(56) References Cited

U.S. PATENT DOCUMENTS 5,478,974 A * 12/1995 O'Dea .................. G01G 23/01 177/25.14
11,560,031 B2 * 1/2023 Niedert ................ B60G 17/021
2006/0052980 A1 * 3/2006 LaFollette .............. G01G 19/02 177/133
2020/0082643 A1 * 3/2020 Nakayama ........... G01G 19/025

FOREIGN PATENT DOCUMENTS

CN 204870428 U * 12/2015

OTHER PUBLICATIONS

Extended European Search Report for European Patent Application No. 22214225.9, mailed May 25, 2023, 5 pages.

* cited by examiner

*Primary Examiner* — Natalie Huls
(74) *Attorney, Agent, or Firm* — Withrow & Terranova, PLLC

(57) ABSTRACT

A computer system comprising a processor device configured to determine that the vehicle is approaching or is located on a weighing device, and when it has been determined that the vehicle is approaching or is located on the weighing device, provide, to the vehicle, information indicating that the vehicle should activate weigh mode, wherein the weigh mode comprises locking of a suspension system of the vehicle such that a current suspension of the vehicle is maintained when the vehicle is being weighed by the weighing device.

10 Claims, 4 Drawing Sheets

SYSTEM AND METHOD FOR LOCKING A SUSPENSION SYSTEM TO WEIGH A VEHICLE

PRIORITY APPLICATIONS

The present application claims priority to European Patent Application No. 22214225.9, filed on Dec. 16, 2022, and entitled "SYSTEM AND METHOD FOR WEIGHING OF A VEHICLE," which is incorporated herein by reference in its entirety.

TECHNICAL FIELD

The disclosure relates generally to a computer system, a computer-implemented method, a vehicle, a computer program product, a control system and a non-transitory computer-readable storage medium. In particular aspects, the disclosure relates to weighing of a vehicle. The disclosure can be applied in heavy-duty vehicles, such as trucks, buses, marine vessels and construction equipment. Although the disclosure may be described with respect to a particular vehicle, the disclosure is not restricted to any particular vehicle.

BACKGROUND

Weighing of vehicles are done for different purposes and using different types of weighing devices. A vehicle can be weighed in order to ensure that a maximum load capacity of the whole vehicle, i.e., truck and trailer, is not exceeded, that the maximum load capacity of the trailer is not exceeded, to ensure compliance with weight restrictions for a particular road etc. Weighing of the vehicle may be performed when the vehicle is standing still or moving.

One type of weighing device is a static weight which is arranged such to weigh the weighing of the vehicle when it stands still. The weighing may be performed when the entire vehicle, i.e., truck and trailer, is located onto the static weighing device. Another example of a weighing device may be an axel weight which is arranged to weigh each axel individually. A further example of a weighing device is a dynamic weight which is arranged to weigh the vehicle while it moves, e.g., drives, over the dynamic weight, i.e., the vehicle remains in motion while being weighed. It does not require the vehicle to stand still during the weighing process. A dynamic weight may be referred to as a rolling weight. Some vehicles may have an onboard weighing device arranged to weigh the vehicle while it moves or standing still.

In view of the above, there is a strive to develop further improved technology relating to weighing of vehicles.

SUMMARY

According to a first aspect of the disclosure, there is provided a computer system comprising a processor device. The processor device is configured to:

- determine that the vehicle is approaching or is located on a weighing device; and
- when it has been determined that the vehicle is approaching or is located on the weighing device, provide, to the vehicle, information indicating that the vehicle should activate weigh mode, wherein the weigh mode comprises locking of a suspension system of the vehicle such that a current suspension of the vehicle is maintained when the vehicle is being weighed by the weighing device.

The first aspect of the disclosure may seek to improve weighing of a vehicle. A technical benefit may include that weighing of the vehicle is improved. Errors in the weighing due to the vehicle height changes is removed or at least reduced when the suspension system is locked during weighing. For example, if the vehicle height is increased, its weight is increased due to the vehicle is pushed down when increasing the height, and such errors are removed or at least reduced when the suspension system is locked during weighing of the vehicle. The accuracy of the weighing is improved when the suspension system is locked during weigh mode.

According to a second aspect of the disclosure, there is provided a computer-implemented method comprising:

- determining, by a processor device of a computer system, that the vehicle is approaching or is located on a weighing device; and
- when it has been determined that the vehicle is approaching or is located on the weighing device, providing, by the processor device and to the vehicle, information indicating that the vehicle should activate weigh mode, wherein the weigh mode comprises:
  - locking of a suspension system of the vehicle such that a current suspension of the vehicle is maintained when the vehicle is being weighed by the weighing device.

The second aspect of the disclosure may seek to improve weighing of a vehicle. Technical benefits of the second aspect of the disclosure are largely analogous to the technical benefits of the first aspect of the disclosure. It shall also be noted that all examples of the second aspect of the disclosure are combinable with all examples of the first aspect of the disclosure, and vice versa.

In some examples, the weigh mode may comprise:

- that the vehicle drives at a predetermined speed and that the predetermined speed is maintained when the vehicle is being weighed by the weighing device.
- A technical benefit may include weighing of the vehicle is further improved. Having a predetermined speed, e.g., a constant speed, when the vehicle is being weighed improves the weighing of the vehicle in that it removes or at least reduces the risk for errors influenced by a changing speed. When speed changes are removed, dynamic error sources in the weighing are also removed or at least reduced.

In some examples, the method may comprise:

- obtaining, by the processor device, a weigh mode request from the weighing device; and, wherein the determining of that the vehicle is approaching or located on the weighing device may be based on the weigh mode request.

The weigh mode request may be obtained from a user, from the weighing device or from any other suitable device. A technical benefit may include that weigh mode may be activated only when necessary. The suspension system may be active as long as possible such that the necessary height adjustments of the vehicle may be performed during a majority of the time, and it is locked only in the time spent during weighing. The weighing device may be arranged to automatically detect that the vehicle is approaching the weighing device and thereby send the weigh mode request, which reduces the need for manual input to activate the weigh mode.

In some examples, the method may comprise:

obtaining, by the processor device, user input indicating that the vehicle is approaching or is located on the weighing device; and wherein the determining of that the vehicle is approaching or is located on the weighing device may be based on the user input.

The user input may be the weigh mode request. A technical benefit may include that a user may manually activate the weigh mode. With user input, it may not be necessary for the weighing device to be arranged to detect that the vehicle is approaching or is located on the weighing device, or the user input may be used in case the weighing device is not currently able to detect the vehicle e.g., due to malfunctioning, communication signal loss etc.

In some examples, the method may comprise:

obtaining, by the processor device, information indicating duration of the weighing of the vehicle; and providing, by the processor device and to the vehicle, information indicating the duration of the weighing of the vehicle.

A technical benefit may include that the vehicle's rout planning may be adjusted according to the duration of the weighing of the vehicle, e.g., the time of arrival at a destination may be adjusted.

In some examples, the method may comprise:

determining, by a processor device, that the weighing of the vehicle has been completed; and when it has been determined that the weighing of the vehicle has been completed, providing, by the processor device and to the vehicle, information indicating that the vehicle should deactivate weigh mode.

A technical benefit may be that the suspension system may be unlocked and thereby starting to adjust the vehicle height as soon as the weighing of the vehicle has been completed.

In some examples, the weighing device may be a dynamic weight arranged to weigh the vehicle when it moves over the dynamic weight. The dynamic weight may be a rolling weight. A technical benefit may be that the vehicle does not need to stop for being weighed. If the vehicle needs to stop for being weighed, then there is a risk that the loading moves as a result of the stopping motion. The risk for movements of the load may be reduced with a dynamic weight. Another technical benefit of a dynamic weight may be that it reduces the time spent on the weighing process, and the driver can quickly continue on his route, and he loses only a small amount of time for the weighing.

According to a third aspect of the disclosure, there is provided a vehicle comprising the processor device to perform the method of the second aspect. Technical benefits of the third aspect of the disclosure are largely analogous to the technical benefits of the first aspect and the second aspect of the disclosure. It shall also be noted that all examples of the third aspect of the disclosure are combinable with all examples of the first aspect and the second aspect of the disclosure, and vice versa.

According to a fourth aspect of the disclosure, there is provided a computer program product comprising program code for performing, when executed by the processor device, the method of the second aspect. Technical benefits of the fourth aspect of the disclosure are largely analogous to the technical benefits of the first aspect, the second aspect and the third aspect of the disclosure. It shall also be noted that all examples of the fourth aspect of the disclosure are combinable with all examples of the first aspect, the second aspect and the third aspect of the disclosure, and vice versa.

According to a fifth aspect of the disclosure, there is provided a control system comprising one or more control units configured to perform the method of the second aspect. Technical benefits of the fifth aspect of the disclosure are largely analogous to the technical benefits of the first aspect, the second aspect, the third aspect and the fourth aspect of the disclosure. It shall also be noted that all examples of the fifth aspect of the disclosure are combinable with all examples of the first aspect, the second aspect, the third aspect and the fourth aspect of the disclosure, and vice versa.

According to a sixth aspect of the disclosure, there is provided a non-transitory computer-readable storage medium comprising instructions, which when executed by the processor device, cause the processor device to perform the method of the second aspect. Technical benefits of the sixth aspect of the disclosure are largely analogous to the technical benefits of the first aspect, the second aspect, the third aspect, the fourth aspect and the fifth aspect of the disclosure. It shall also be noted that all examples of the sixth aspect of the disclosure are combinable with all examples of the first aspect, the second aspect, the third aspect, the fourth aspect and the fifth aspect of the disclosure, and vice versa.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

When measuring a vehicle's weight, the measurement accuracy may be decreased due to a number of factors. For example, the measurement accuracy may be decreased if height adjustment is done during weighing. The vehicle's suspension system may not be aware of that an external weighing is ongoing and the vehicle height may therefore be adjusted due to changed road condition at the weighing location.

Figure 1:
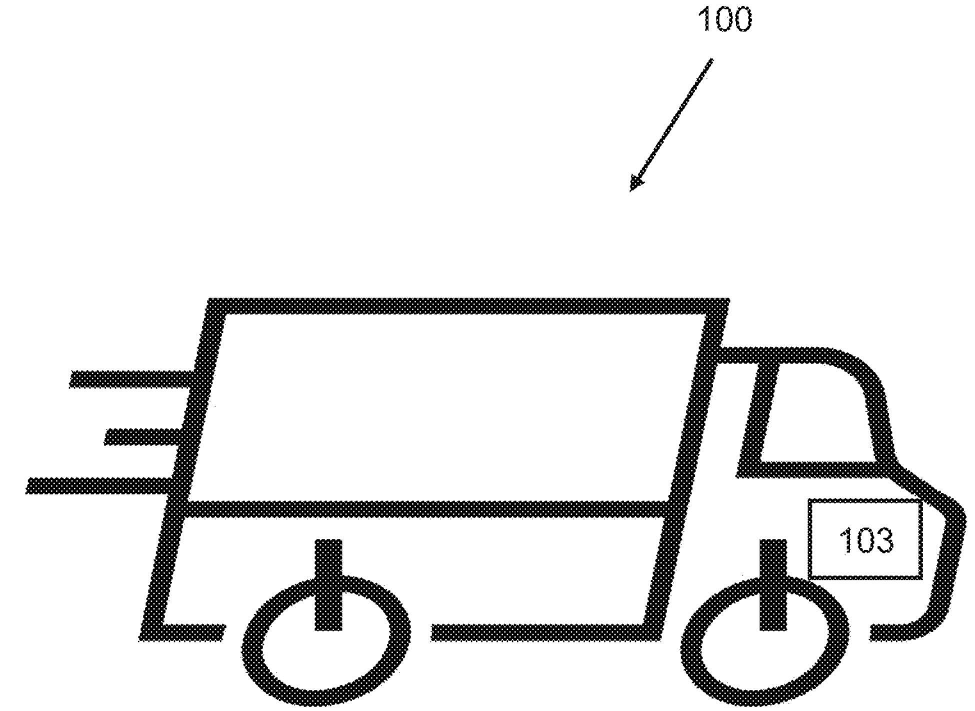
FIG. 1 is an exemplary schematic illustration of a vehicle, according to one example.

FIG. 1 is an exemplary schematic illustration of a vehicle 100, according to one example. The vehicle 100 may be a heavy-duty vehicle, such as a truck, bus, marine vessel, construction equipment etc. The vehicle 100 may comprise a truck and one or more connected trailers, or the vehicle 100 may comprise only the truck without any connected trailer.

Figure 4:
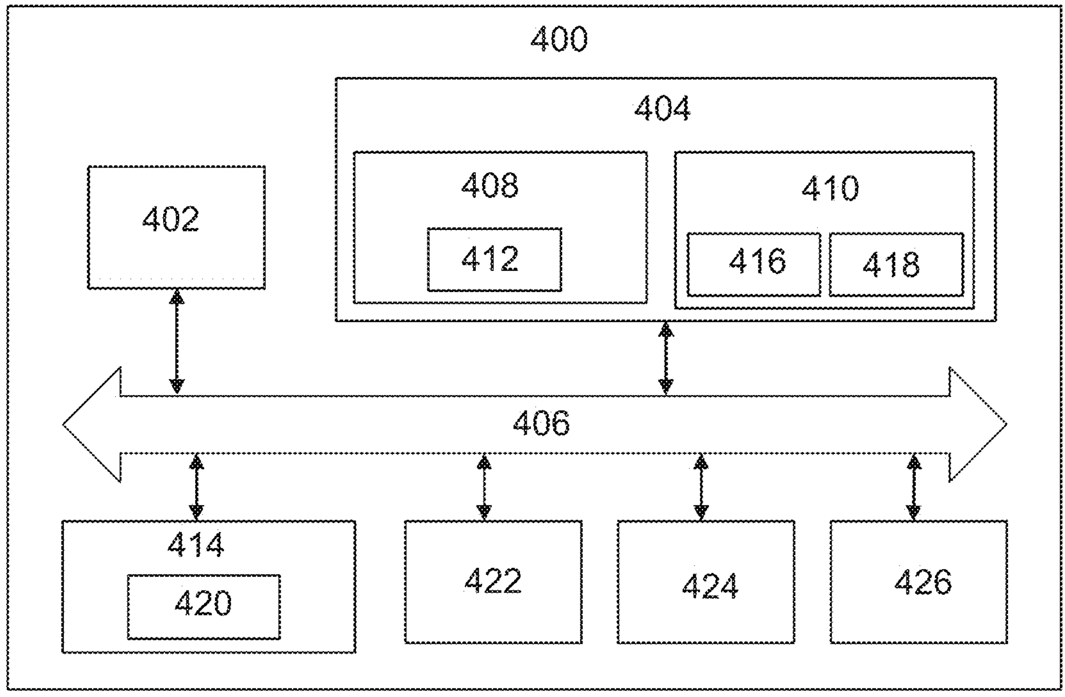
FIG. 4 is a schematic diagram of an exemplary computer system for implementing examples disclosed herein, according to one example.

The vehicle 100 may comprise a control system 103, or one or more control units comprised in the control system 103. The control system 103 may be completely comprised onboard the vehicle 100, it may be partly comprised onboard the vehicle 100 and partly comprised in an offboard system or unit, e.g., at a different location such as for example a central server, a cloud device, a mobile device etc., or the control system 103 it may be completely comprised in an offboard system or unit. When at least partly comprised onboard the vehicle 100, the control system 103 may be located at any suitable location onboard the vehicle 100. The control system 103 comprises one or more control units. The control system 103 may comprise a processor device 402 (reference number 402 is illustrated in FIG. 4) or the control system 103 may be the processor device 402. The processor device 402 may be a control unit or comprised in a control unit. The control system 103 may be a computer system 400 (reference number 400 is illustrated in FIG. 4) comprising the processor device 402.

Figure 2:
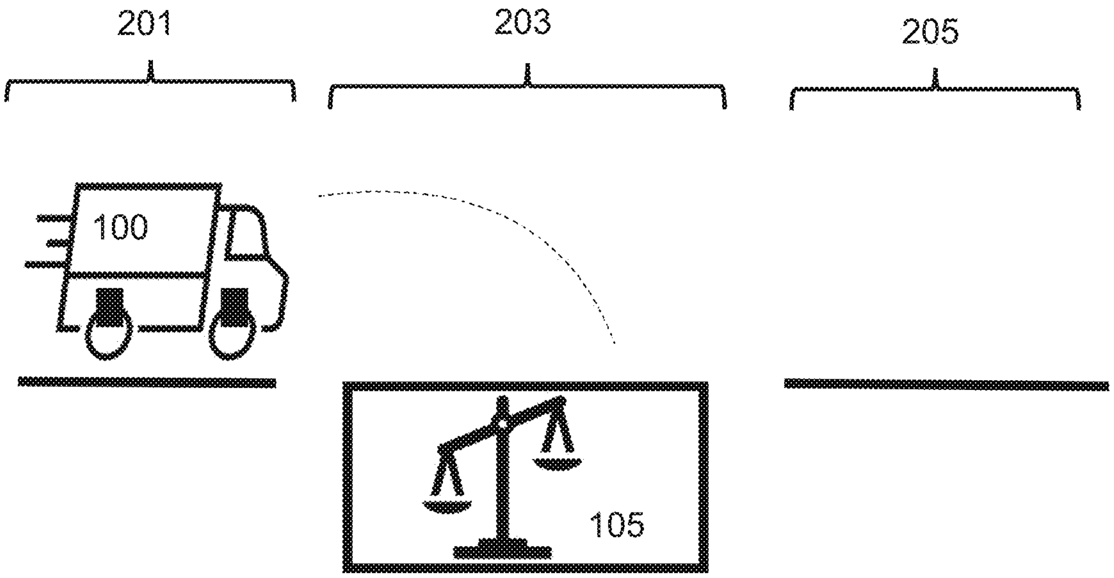
FIG. 2 is an exemplary schematic illustration of vehicle weighing, according to one example.

FIG. 2 is an exemplary schematic illustration of vehicle weighing, according to one example. In step 201, the vehicle 100 is driving and approaches a weighing device 105 or the vehicle 100 is located on the weighing device 105, i.e. it drives over the weighing device 105. The processor device 402, the control unit or the control system 103, may determine that the vehicle 100 approaches or is located on the weighing device 105 for example by obtaining information indicating that the vehicle 100 is approaching or is located on the weighing device 105. The information may be in the form of images obtained from an image capturing device, e.g., a surveillance camera or similar, arranged to capture images and/or videos of the surroundings of the weighing device 105, it may be in the form of information from a sensor, e.g., a proximity sensor, a radar, arranged to detect objects such as a vehicle 100 in the surroundings of the weighing device 105. The information indicating that the vehicle 100 may comprise user input from a user which has manually indicated, e.g. via a mobile phone, an input unit onboard the vehicle 100 etc., that the vehicle 100 approaches or is located on the weighing device 105. The user may only need to activate or accept the weigh mode via the input unit, and then the processor device 402, the control unit or the control system 103, may perform the rest of the procedure. The user input may be provided by a user when he/she is inside or outside the vehicle 100.

The weighing device 105 may be any suitable weighing device, for example a dynamic weight arranged to weigh the vehicle 100 when it moves, e.g., drives, over the dynamic weight. The dynamic weight may be a rolling weight. A dynamic weight is efficient and timesaving since it can be used during operation of the vehicle 100, and it does not need any operator or needs very little operator involvement.

In step 203, information indicating activation of weigh mode is provided to the vehicle 100. The information may be provided from the processor device 402 to the vehicle 100, or from the processor device 402 located onboard the vehicle 100 to another system or device onboard the vehicle 100, i.e. a system or device arranged to handle weigh mode. Step 203 may be described to comprise a request for weigh mode activation. Step 203 may be performed by the control unit or the control system 103.

The weigh mode comprises to lock the suspension system comprised in the vehicle 100. In order to lock the suspension system, the information indicating activation of weigh mode comprises information to lock the suspension system. The information to lock the suspension system may be sent from the processor device 402, the control unit or the control system 103, to the suspension system or to a suspension system controller which performs the actual locking of the suspension.

The suspension system comprised in the vehicle 100 is arranged to adjust the height of the vehicle 100. It may be desirable to adjust the height of the vehicle 100 for example when driving on a bumpy road where the suspension system may enable a smooth and comfortable ride quality, the suspension system may be arranged to handle different loads on the vehicle 100 etc. The suspension system may be of any suitable type, for example an air suspension system, an electromagnetic induction suspension system, hydraulic suspension system etc.

The weigh mode may comprise to lock the speed of the vehicle 100 during weighing, i.e., to keep an at least partly constant speed during weighing, to keep the speed within a speed range. The at least partly constant speed of the vehicle 100 during weighing may be below a speed threshold, and the speed threshold may be e.g., 3 km/h, 5 km/h, 7 km/h or any other suitable speed. The speed of the vehicle 100 may be a low speed, e.g., 3 km/h, 5 km/h, 7 km/h. The speed range may be for example 1-10 km/h, 1-8 km/h, 2-7 km/h etc. In order to lock the speed of the vehicle 100, the information indicating activation of weigh mode comprises information to lock the speed, it comprises information about what the at least partly constant speed should be. The information to lock the speed may be sent from the processor device 402 to a speed controller, e.g., a cruise control system, which performs the actual locking of the speed. The at least partly constant speed may be an optimal speed which may be optimal for weighing of the vehicle 100.

An at least partly constant speed may comprise that there are substantially no speed changes, with some tolerance. When there are substantially no speed changes, dynamic error sources in the weighing are also removed or at least reduced. With at least partly constant speed, errors which may come from vehicle movements during the weighing may be reduced or removed. The errors may be associated with vertical movements from e.g., the control of the air system, lateral movements from control or movements in the load comprised in the vehicle 100, lateral movements from acceleration or retardation of the vehicle 100 etc. The errors may be associated with that when the vehicle brakes, this may create a curtsy effect, and which may create unwanted movements of the vehicle 100. Another example may be that if the gear system changes gear, this may cause a dynamic pull. Furthermore, if an increased force is applied to the drive train, a twisting effect may arise in the engine and in the drive train.

The weigh mode may comprise to lock other features and/or functions of the vehicle 100 for example a control system, axel lifting system, axel pressure distribution system. When locking these other features and/or functions their status may be maintained during weigh mode. The other features and/or functions may be in the same state or in different states during weighing. When they are in different states, the actual weighing instance may be tagged or weighted differently dependent on the state of each of the respective features and/or functions at the weighing.

The weigh mode may comprise to enable the vehicle 100 to enter a weighing position with respect to the weighing device 105. The weighing position may be the best or optimal position for weighing. In one example, this may be done that the user of the vehicle 100 obtains information about the weighing position and consequently positions the vehicle 100 in the weighing position. The information may be obtained from the weighing device 105, it may be predetermined or obtained in any other suitable fashion. In another example, enabling the vehicle 100 to enter the weighing position may be done by the vehicle 100 obtaining information about the weighing position, e.g., from the weighing device 105 and/or the processor device 402, and positions itself at the weighing position, without any user involvement, i.e., it autonomously positions itself. In another example, the weighing device 105 and/or the processor device 402 may control the vehicle 100 to the weighing position, i.e., it guides or navigates the vehicle 100 to the weighing position. The weighing device 105 and/or the processor device 402 may take control over the vehicle 100 during the weigh mode, i.e., the weighing may be performed autonomously and without a user onboard the vehicle 100. The controlling of the vehicle 100 to the weighing position and the overtaking of control of the vehicle 100 may be performed by the control unit or the control system 103.

The weigh mode may comprise to determine that calibration of the weighing device 105 needs to be performed, and/or to perform the calibration of the weighing device 105. Performing calibration may be automatically performed when the weigh mode is activated, or it may be determined to be performed when one or more criterions are fulfilled. Calibration may be described as a procedure for the weighing device to find a stable value for the weighing and it may comprise to comparing the reading of a weighing device 105 with a reference weight and adjusting the weighing device 105 based on the result of the comparison. The calibration of the weighing device 105 increases the reliability and accuracy of the weighing.

With the weigh mode, it may be possible to keep track of variations from other weighing of the vehicle 100 and this may be used to detect an interval during which the vehicle's weight varies.

The vehicle 100 moves, i.e., drives, over the weighing device 105 when being weighed. When weigh mode has been activated, the weighing device 105 weighs the vehicle 100.

In step 205, the weighing is completed, and the weigh mode is deactivated. When the weigh mode is deactivated, the suspension system is unlocked. When the weigh mode is deactivated, the speed of the vehicle 100 is unlocked. Completion of the weighing may be determined by that the weighing device 105 sends information indicating completion of the weighing to the processor device 402, the processor device 402 may determine that the weighing is completed by obtaining information indicating that the vehicle 100 is no longer located on the weighing device 105, for example from information from an image capturing device, sensors etc. As above, the control unit or the control system 103 may perform the actions of the processor device 402 in step 205. Information indicating completion of the weighing may be obtained from user input from a user which has manually indicated, e.g., via a mobile phone, an input unit onboard the vehicle 100 etc., that the weighing is completed. Step 205 may be described to comprise a request for weigh mode deactivation.

Figure 3:
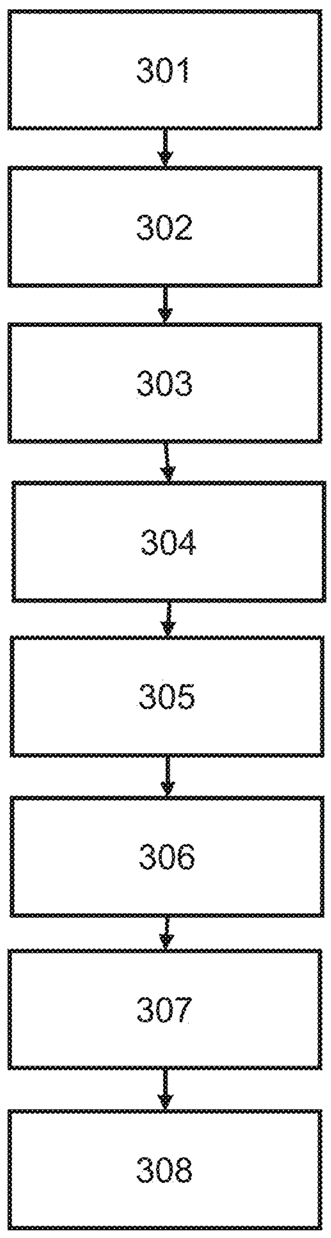
FIG. 3 is an exemplary flow chart illustrating a method, according to one example.

FIG. 3 is an exemplary flow chart illustrating a method, according to one example. The method may be performed by the control system 103, a control unit comprised in the control system or it may be performed by the processor device of the computer system 400. As mentioned previously, the control system 103 comprises one or more control units. The control system 103 may be the computer system 400 or the control system 103 may be comprised in the computer system 400. The control system 103 may comprise the processor device 402 or the control system 103 may be the processor device 402. The processor device 402 may be the control unit or the processor device 402 may be comprised in the control unit. The computer system 400 comprises the processor device 402. Consequently, the method illustrated in FIG. 3 may be performed by the control system 103, the control unit or the processor device 402. The method comprises at least one of the following steps, which steps may be performed in any suitable order than described below.

Step 300: This step corresponds to steps 201 and 203 in FIG. 2. The processor device 402, the control unit or the control system 103, may obtain a weigh mode request from the weighing device 105. The weighing device 105 may be a dynamic weight arranged to weigh the vehicle 100 when it drives over the dynamic weight. The weighing device 105 may be triggered to send the weigh mode request when it has detected a vehicle 100 is approaching or is located on the weighing device 105.

Step 302: This step corresponds to step 201 and step 203 in FIG. 2. The processor device 402, the control unit or the control system 103, may obtain user input indicating that the vehicle 100 is approaching or is located on the weighing device 105. The user input may be the weigh mode request, or it may be comprised in the weigh mode request in step 300.

Step 303: This step corresponds to step 201 in FIG. 2. The processor device 402 of the computer system 400, the control unit or the control system 103, determines that the vehicle 100 is approaching or is located on a weighing device 105. The determining of that the vehicle 100 is approaching or located on the weighing device 105 may be based on the weigh mode request from step 300. The determining of whether the vehicle 100 is approaching or is located on the weighing device 105 may be based on the user input from step 302.

Step 304: The processor device 402, the control unit or the control system 103, may obtain information indicating a time duration of the weighing of the vehicle 100. The information indicating the time duration of the weighing of the vehicle 100 may be obtained before the weighing takes place, after the weighing has lasted for a predetermined amount of time, or directly after the weighing is finished. The information indicating the duration of the weighing may be obtained from the weighing device 105, a user of the vehicle 100 which manually takes the time and inputs it to the professor device, e.g., via a display, an audio input device or other input devices. The time duration of the weighing may be determined using information about the capacity of the weighing device 105, previous weighing of the actual vehicle 100 or other vehicles 100. The time duration may be determined by the weighing device 105 and information about the time duration may be provided to the processor device 402, or the time information may be determined by the processor device 402, based on information from the weighing device 105, e.g., capacity, previous weighing.

Step 305: The processor device 402, the control unit or the control system 103, may provide, to the vehicle 100, information indicating the duration of the weighing of the vehicle 100. With the information indicating the duration of the weighing of the vehicle 100, the vehicle 100 and/or the user of the vehicle 100 may adapt its route planning by for example adapting the time of arrival at the destination.

Step 306: This step corresponds to step 203 in FIG. 2. When it has been determined that the vehicle 100 is approaching or is located on the weighing device 105, the processor device 402, the control unit or the control system 103 provides, to the vehicle 100, information indicating that the vehicle 100 should activate weigh mode. Consequently, the vehicle 100 activates the weigh mode. The weigh mode comprises locking of a suspension system of the vehicle 100 such that a current suspension of the vehicle 100 is maintained when the vehicle 100 is being weighed by the weighing device 105.

The weigh mode may comprise that the vehicle 100 drives with a predetermined and at least partly constant speed and that the predetermined speed is maintained when the vehicle 100 is being weighed by the weighing device 105.

When the weigh mode has been activated, the weighing device 105 starts weighing the vehicle 100. The weighing device 105 may start weighing of the vehicle 100 after having received a confirmation from the vehicle 100 that the weigh mode has been activated, it may start weighing of the vehicle 100 a predetermined amount of time after the weighing device 105 has detected that the vehicle 100 is approaching or is located on the weighing device 105.

Step 307: The processor device 402, the control unit or the control system 103, may determine that the weighing of the vehicle 100 has been completed. The processor device 402 may determine that the weighing of the vehicle 100 has been completed by receiving information indicating the completion from the weighing device 105 and/or the vehicle 100 and/or the user of the vehicle 100, by determining that the time duration of the vehicle 100 from step 304 has expired, or by any other suitable method.

Step 308: This step corresponds to step 205 in FIG. 2. When it has been determined that the weighing of the vehicle 100 has been completed, the processor device 402, the control unit or the control system 103 may provide, to the vehicle 100, information indicating that the vehicle 100 should deactivate weigh mode. Providing information indicating that the vehicle 100 should deactivate weigh mode may comprise a request for weigh mode deactivation, or it may be the request for weigh mode deactivation. Consequently, the vehicle 100 deactivates its weigh mode. When weigh mode has been deactivated, the suspension system of the vehicle 100 is unlocked such that the vehicle height may be adjusted. When weigh mode has been deactivated, the vehicle speed is unlocked such that the vehicle 100 may drive in any suitable speed.

A computer system 400 comprises a processor device 402 configured to:

- determine that the vehicle 100 is approaching or is located on a weighing device 105; and
- when it has been determined that the vehicle is approaching or is located on the weighing device 105, provide, to the vehicle 100, information indicating that the vehicle 100 should activate weigh mode, wherein the weigh mode comprises locking of a suspension system of the vehicle 100 such that a current suspension of the vehicle 100 is maintained when the vehicle 100 is being weighed by the weighing device 105.

The above may be described as a control system 103 or control unit configured to:

- determine that the vehicle 100 is approaching or is located on a weighing device 105; and
- when it has been determined that the vehicle is approaching or is located on the weighing device 105, provide, to the vehicle 100, information indicating that the vehicle 100 should activate weigh mode, wherein the weigh mode comprises locking of a suspension system of the vehicle 100 such that a current suspension of the vehicle 100 is maintained when the vehicle 100 is being weighed by the weighing device 105.

A vehicle 100 comprises the processor device 402 to perform the method described herein, i.e., the vehicle 100 comprises a control unit or control system 103 to perform the method described herein.

A computer program product comprises program code for performing, when executed by the processor device 402, the method described herein. In other words, the computer program product comprises program code for performing, when executed by the control unit or the control system 103, the method described herein.

A control system 103 comprises one or more control units configured to perform the method described herein.

A non-transitory computer-readable storage medium comprises instructions, which when executed by the processor device 402, cause the processor device 402 to perform the method described herein. In other words, the transitory computer-readable storage medium comprises instructions, which when executed by the control unit or the control system 103, cause the control unit or the control system 103, respectively, to perform the method described herein.

FIG. 4 is a schematic diagram of a computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system, e.g., the control system 103 illustrated in FIG. 1, may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include a processor device 402 (may also be referred to as a control unit), a memory 404, and a system bus 406. The computer system 400 may include at least one computing device having the processor device 402. The system bus 406 provides an interface for system components including, but not limited to, the memory 404 and the processor device 402. The processor device 402 may include any number of hardware components for conducting data or signal processing or for executing computer code stored in memory 404. The processor device 402 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processor device 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with a processor device 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program product 420 stored on a transitory or non-transitory computer-usable or computer-readable storage medium (e.g., single medium or multiple media), such as the storage device 414, which includes complex programming instructions (e.g., complex computer-readable program code) to cause the processor device 402 to carry out the steps described herein. Thus, the computer-readable program code can comprise software instructions for implementing the functionality of the examples described herein when executed by the processor device 402. The processor device 402 may serve as a controller or control system for the computer system 400 that is to implement the functionality described herein.

The computer system 400 also may include an input device interface 422 (e.g., input device interface and/or output device interface). The input device interface 422 may be configured to receive input and selections to be communicated to the computer system 400 when executing instructions, such as from a keyboard, mouse, touch-sensitive surface, etc. Such input devices may be connected to the processor device 402 through the input device interface 422 coupled to the system bus 406 but can be connected through other interfaces such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may also include a communications interface 426 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Summarized, when measuring the weight of a vehicle 100 on a weighing device 105, e.g., a dynamic weight, a rolling weight, the measurement accuracy may be decreased if height adjustment of the vehicle 100 is done during weighing. The suspension system is not aware that the weighing is ongoing and the height of the vehicle 100 may be adjusted by the suspension system due to changed road condition where the weighing device 105 is located. To reduce or avoid measurement accuracy errors, the suspension of the vehicle 100 during weighing is therefore locked. In addition, the vehicle speed may be kept constant during weighing. The suspension system may be informed that it should not perform any for a short while (a few seconds) when the weighing is performed. The speed control of the vehicle 100 may be informed to go to optimized speed for weight measurements and keep a steady speed.

Locking of the suspension system, and possibly also the constant speed, may be referred to as a weigh mode. The weigh mode may be manually activated by a user via a Human Machine Interface (HMI). The HMI may be integrated into the vehicle 100, it may be comprised in a mobile device such as a mobile phone, a table computer etc. As an alternative, the weighing device 105 may detect a short distance towards the vehicle 100 and then request weigh mode activation.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. As used herein, the term “and/or” includes any and all combinations of one or more of the associated listed items. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being “connected” or “coupled” to another element, it can be directly connected or coupled to the other element, or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to:

determine that a vehicle is approaching or is located on a weighing device; and upon determining that the vehicle is approaching or is located on the weighing device, cause the vehicle to lock a suspension system of the vehicle such that a current suspension of the vehicle is maintained when the vehicle is being weighed by the weighing device.

2. A computer-implemented method, the method comprising:

determining, by a processor device of a computer system, that a vehicle is approaching or is located on a weighing device; and upon determining that the vehicle is approaching or is located on the weighing device, causing the vehicle to lock a suspension system of the vehicle such that a current suspension of the vehicle is maintained when the vehicle is being weighed by the weighing device.

3. The method of claim 2, further comprising causing the vehicle to drive with a predetermined speed and that the predetermined speed is maintained when the vehicle is being weighed by the weighing device.

4. The method of claim 2, further comprising:

obtaining, by the processor device, a weigh mode request from the weighing device; and wherein the determining that the vehicle is approaching or located on the weighing device is based on the weigh mode request.

5. The method of claim 2, further comprising:

obtaining, by the processor device, user input indicating that the vehicle is approaching or is located on the weighing device;

wherein the determining that the vehicle is approaching or is located on the weighing device is based on the user input.

6. The method of claim 2, further comprising:

obtaining, by the processor device, information indicating duration of the weighing of the vehicle; and providing, by the processor device and to the vehicle, information indicating the duration of the weighing of the vehicle.

7. The method of claim 2, wherein the weighing device is a dynamic weight arranged to weigh the vehicle when it moves over the dynamic weight.

8. A vehicle comprising a processor device to perform the method of claim 2.

9. A control system comprising one or more control units configured to perform the method of claim 2.

10. A non-transitory computer-readable storage medium comprising instructions, which when executed by a processor device, cause the processor device to perform the method of claim 2.

* * * * *